United States Patent
Ku et al.

(10) Patent No.: US 9,135,628 B2
(45) Date of Patent: Sep. 15, 2015

(54) METHOD FOR PROVIDING ADVERTISEMENT INDUCING ACTIVE PARTICIPATION FROM TARGETED CUSTOMERS AND SYSTEM THEREFOR

(75) Inventors: Young Bae Ku, Gwanark-gu (KR); Hwa Hyeon Ryu, Gwanak-gu (KR)

(73) Assignee: eBay Inc., San Jose, CA (US)

( * ) Notice: Subject to any disclaimer, the term of this patent is extended or adjusted under 35 U.S.C. 154(b) by 435 days.

(21) Appl. No.: 12/303,293

(22) PCT Filed: Jun. 1, 2007

(86) PCT No.: PCT/KR2007/002673
§ 371 (c)(1),
(2), (4) Date: Feb. 4, 2009

(87) PCT Pub. No.: WO2007/142435
PCT Pub. Date: Dec. 13, 2007

(65) Prior Publication Data
US 2010/0017281 A1    Jan. 21, 2010

(30) Foreign Application Priority Data
Jun. 5, 2006  (KR) ........................ 10-2006-0050243

(51) Int. Cl.
*G06Q 30/02*    (2012.01)

(52) U.S. Cl.
CPC ............ *G06Q 30/02* (2013.01); *G06Q 30/0217* (2013.01)

(58) Field of Classification Search
CPC ............ G06Q 30/0217; G06Q 30/239; G06Q 30/0203
USPC .................................. 705/14.19, 14.39, 7.32
See application file for complete search history.

(56) References Cited

U.S. PATENT DOCUMENTS 6,236,975 B1 *   5/2001   Boe et al. ...................... 705/7.32
7,580,862 B1 *   8/2009   Montelo et al. ............... 705/26.1
(Continued)

FOREIGN PATENT DOCUMENTS

EP        1209600 A1    5/2002
JP    2002-157512 A     5/2002
(Continued)

OTHER PUBLICATIONS

"Japanese Application Serial No. 2009-514194, Office Action mailed Mar. 7, 2013", with English translation of claims, 6 pgs.
(Continued)

*Primary Examiner* — Eric Netzloff
(74) *Attorney, Agent, or Firm* — Schwegman Lundberg & Woessner, P.A.

(57) ABSTRACT

A method for providing advertisement inducing active participation from targeted customers and a system therefore includes providing a high advertising effect to advertisers through active participation of customers and offering a predetermined compensation to customers participated in consultation. The method for providing advertisement inducing active participation from targeted customers comprises: (a) receiving consultation advertisement registering information from advertisers; (b) outputting consultation advertisement depending on the input registering information; (c) receiving consultation requesting information from customers about the consultation advertisement; and (d) providing a predetermined compensation to customers who input the consultation requesting information.

14 Claims, 10 Drawing Sheets

(56) References Cited

U.S. PATENT DOCUMENTS

| | | | |
|---|---|---|---|
| 7,840,691 B1* | 11/2010 | De Bonet et al. | 709/231 |
| 2002/0062248 A1 | 5/2002 | Sakurai | |
| 2002/0120846 A1* | 8/2002 | Stewart et al. | 713/168 |
| 2003/0126205 A1* | 7/2003 | Lurie | 709/204 |
| 2005/0065846 A1* | 3/2005 | Burger | 705/14 |
| 2006/0085408 A1* | 4/2006 | Morsa | 707/3 |
| 2007/0208868 A1* | 9/2007 | Kidd et al. | 709/229 |
| 2008/0077478 A1* | 3/2008 | Kim | 705/10 |

FOREIGN PATENT DOCUMENTS

| | | | |
|---|---|---|---|
| JP | 2002259815 A | 9/2002 |
| JP | 200322376 A | 1/2003 |
| JP | 2003-044648 A | 2/2003 |
| JP | 2003304336 A | 10/2003 |
| JP | 2004-038371 A | 2/2004 |
| JP | 2004280652 A | 10/2004 |
| JP | 200585135 A | 3/2005 |
| KR | 10-2002-0004106 A | 1/2002 |
| KR | 10-2002-0029187 A | 4/2002 |

OTHER PUBLICATIONS

"Japanese Application Serial No. 2009-514194, Office Action mailed May 6, 2011", with English translation of claims, 6 pgs.

* cited by examiner

| ▲ Step 4: Direct Transaction Information | | | | |
|---|---|---|---|---|
| Received or not | Invitation ▶ Period 20060426  20060726 | | | |
| Standard Price | 0 | | | |
| Basic Condition | SET UP | | | |
| G-Stamp Offer | G·stamp offer  0 | × | 0 | =extra  0  cash |
| * Condition | ☐ Sex  Mail ▶<br>☐ Region  Seoul ▶<br>☐ Age  34 ▶ | | | |

| | | | | |
|---|---|---|---|---|
| [MANAGEMENT] | | | | |
| ▶Reservation Management | | RESERVATION DATE ▼ 20060419 ~ 20060426 Search Excel | | |
| Classification Status Reservation# Name Prefering Date Contact1 Contact2 Email Address Product Name Product code | | | | |

Reservation Number: [ ]
▶ Product Details

| Product Name | | Product Numbers | [ ] / [ ] | |
|---|---|---|---|---|
| Consultation Condition | | Benefit offer | | Management |
| Consultation Display Period | | Inventory | | |

▶ Reservation / Consultation Specifications

| Subscriber Name | | Gmarket ID | |
|---|---|---|---|
| E-mail Address | | Consultation Requesting Date | |
| Phone Number | | ID Number | |
| Required Entry Items | | | |
| Others | | | |

▶ Consultation Management

| Present Status | [ ▼ ] | |
|---|---|---|
| Modified Status | Rewuesting ▼ | Modification |

METHOD FOR PROVIDING ADVERTISEMENT INDUCING ACTIVE PARTICIPATION FROM TARGETED CUSTOMERS AND SYSTEM THEREFOR

CROSS-REFERENCE TO RELATED APPLICATION

This application is the U.S. national stage application of International Patent Application No. PCT/KR2007/002673, filed Jun. 1, 2007, the disclosure of which is hereby incorporated by reference in its entirety.

TECHNICAL FIELD

The present invention generally relates to a method for providing advertisement inducing active participation from targeted customers and a system therefor, and more specifically, to a technology of providing a high advertising effect to advertisers through active participation of customers and offering a predetermined compensation to customers participated in consultation.

BACKGROUND ART

In a conventional advertisement marketing method, an advertiser provides a certain registration cost to advertising companies that show advertising contents provided by the advertiser. As a result, it is difficult to improve the advertising effect by inducing active participation of customers.

DISCLOSURE OF INVENTION

Technical Problem

Various embodiments of the present invention are directed at providing a method for providing advertisement inducing active participation from targeted customers to provide a high advertising effect to advertisers through active participation of customers and offer a predetermined compensation to customers participated in consultation.

Technical Solution

According to an embodiment of the present invention, a method for providing advertisement inducing active participation from targeted customers comprises: (a) receiving consultation advertisement registering information from advertisers; (b) outputting consultation advertisement depending on the input registering information; (c) receiving consultation requesting information from customers about the consultation advertisement; and (d) providing a predetermined compensation to customers who input the consultation requesting information.

According to an embodiment of the present invention, a system for providing advertisement inducing active participation from targeted customers comprises: an input unit configured to receive consultation advertisement registering information from advertisers and consultation request information from customers; a consultation advertising information storage unit configured to store consultation advertising registering information received from the advertisers and consultation request information received from customers; a customer information storage unit configured to store customer information; and a consultation advertisement processing unit configured to output consultation advertisement depending on consultation advertisement registering information received from the advertisers, provide consultation request information received from the customers and offer a predetermined compensation to a customer who requests a consultation.

BRIEF DESCRIPTION OF THE DRAWINGS

FIG. 8 is an example illustrating a consultation advertisement output screen according to an embodiment of the present invention.

BEST MODE FOR CARRYING OUT THE INVENTION

The present invention will be explained with reference to the accompanying drawings.

Figure 1:
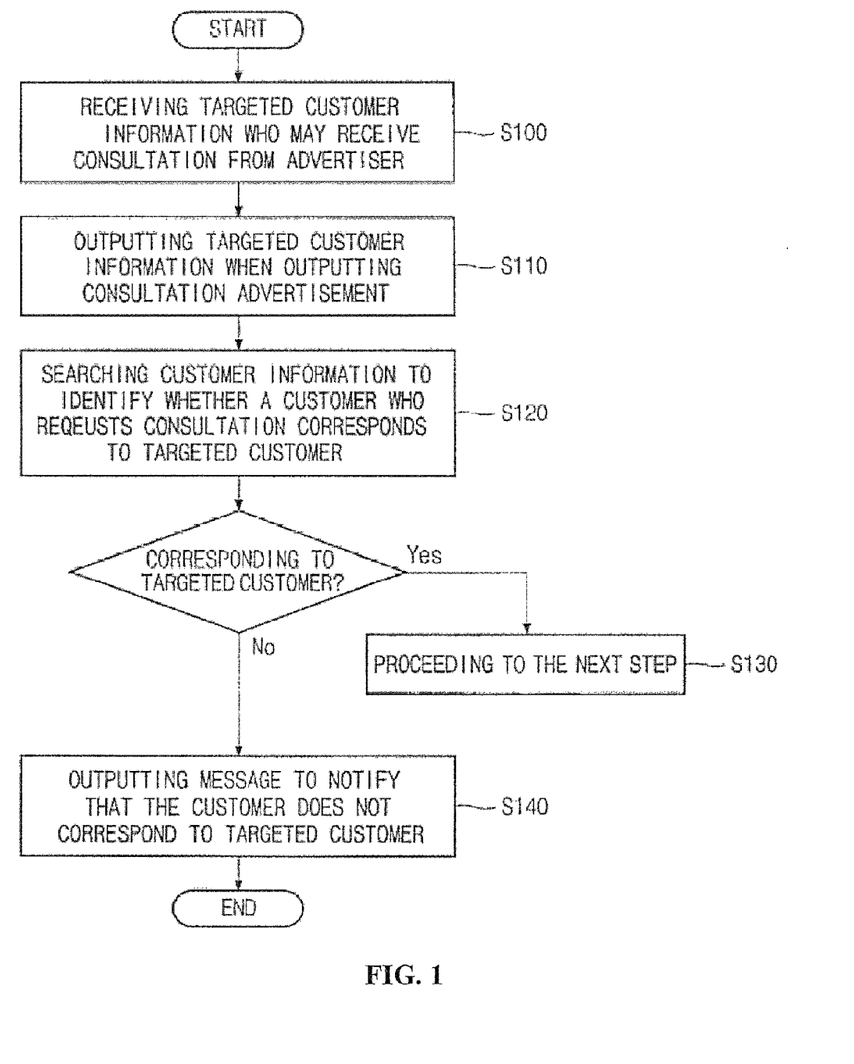
FIG. 1 is a flow chart illustrating a method for selecting customers targeted to receive consultation in advertisement according to an embodiment of the present invention.

FIG. 1 is a flow chart illustrating a method for selecting customers targeted to receive consultation in advertisement according to an embodiment of the present invention.

Referring to FIG. 1, information on targeted customers who can receive consultation is inputted depending on consultation advertisement from advertisers (S100). The range of targeted customers who can receive consultation can be determined by sex, regional groups and age.

When the consultation advertisement is outputted, the information on targeted customers is also outputted (S110).

When a customer requests a consultation, information on the customer is searched to confirm whether the customer who requests a consultation corresponds to a targeted customer (S120).

If the customer corresponds to the targeted customer, the next step proceeds (S130). Otherwise, a message is outputted to notify that the customer does not correspond to the targeted customer (S140).

Figure 2:
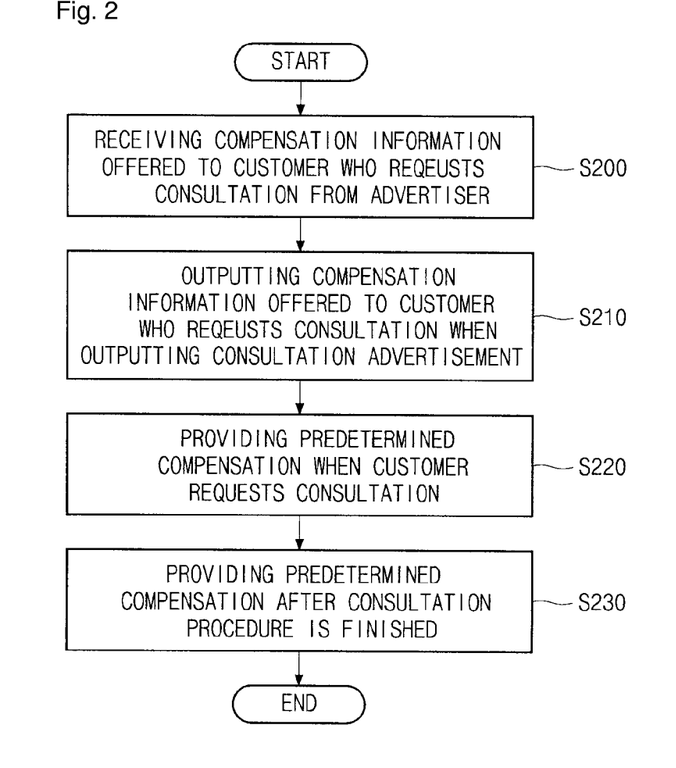
FIG. 2 is a flow chart illustrating a method for providing compensation to a customer who requests a consultation according to an embodiment of the present invention.

FIG. 2 is a flow chart illustrating a method for providing compensation to a customer who requests a consultation according to an embodiment of the present invention.

Referring to FIG. 2, compensation information offered to a customer who requests a consultation is inputted from advertisers (S200). A compensation may be provided upon consultation request or depending on proceeding results after the consultation procedure is finished so that compensation information of each case can be inputted.

Then, when the consultation advertisement is outputted, the compensation information offered to the customer who requests a consultation is also outputted (S210).

When the customer requests a consultation, a predetermined compensation is immediately provided (S220).

After the consultation procedure is finished, a predetermined compensation is provided (S230).

Figure 3:
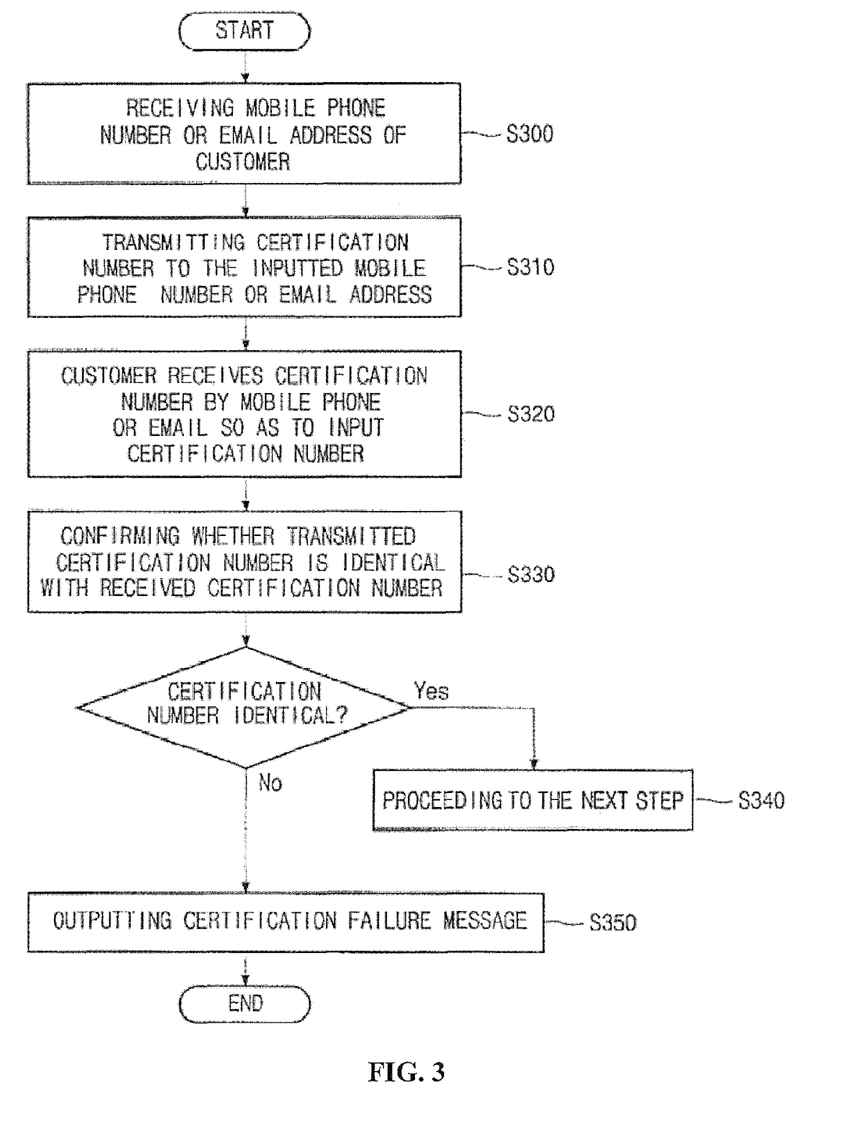
FIG. 3 is a flow chart illustrating a customer certifying method in consultation advertisement according to an embodiment of the present invention.

FIG. 3 is a flow chart illustrating a customer certifying method in consultation advertisement according to an embodiment of the present invention.

Referring to FIG. 3, a mobile phone number or an email address of the customer is inputted (S300).

Then, a certification number is transmitted by the mobile phone number or the email address (S310).

Next, a customer receives the certification number by a mobile phone or an email to input the certification number (S320).

Thereafter, the customer confirms whether the transmitted certification number is identical with the received certification number (S330).

The next step proceeds (S340) if the certification numbers are the same, and a message that represents certification failure is outputted (S350) if the certification numbers are not the same.

Figure 4:
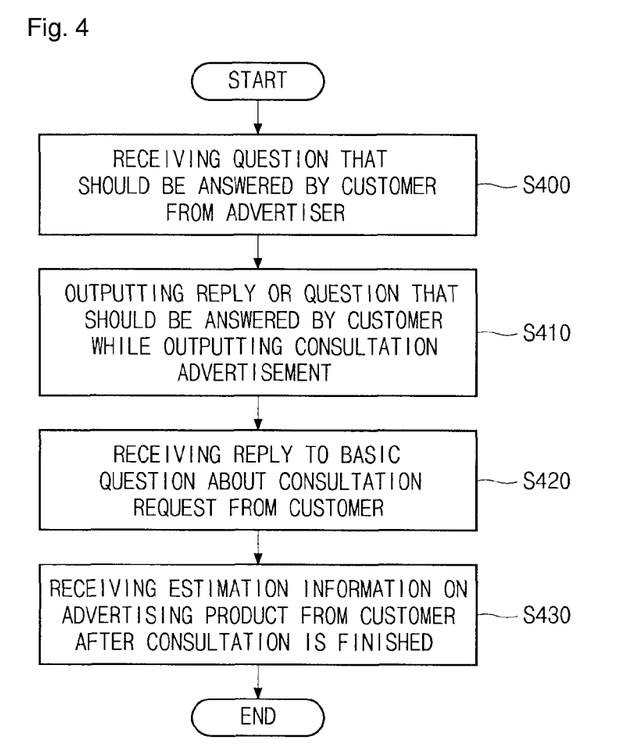
FIG. 4 is a flow chart illustrating a method for collecting marketing information through consultation advertisement according to an embodiment of the present invention.

FIG. 4 is a flow chart illustrating a method for collecting marketing information through consultation advertisements according to an embodiment of the present invention.

Referring to FIG. 4, a question that a customer responds to is inputted from an advertiser (S400). A reply to the question can be inputted when the question has a multiple choice type.

Then, the question that the customer responds to or the replay thereto is outputted while the consultation advertisement is outputted (S410).

Next, a reply to a basic question on a consultation request is inputted from the customer (S420).

After consultation, estimation information on advertising products is inputted from the customer (S430).

Figure 5:
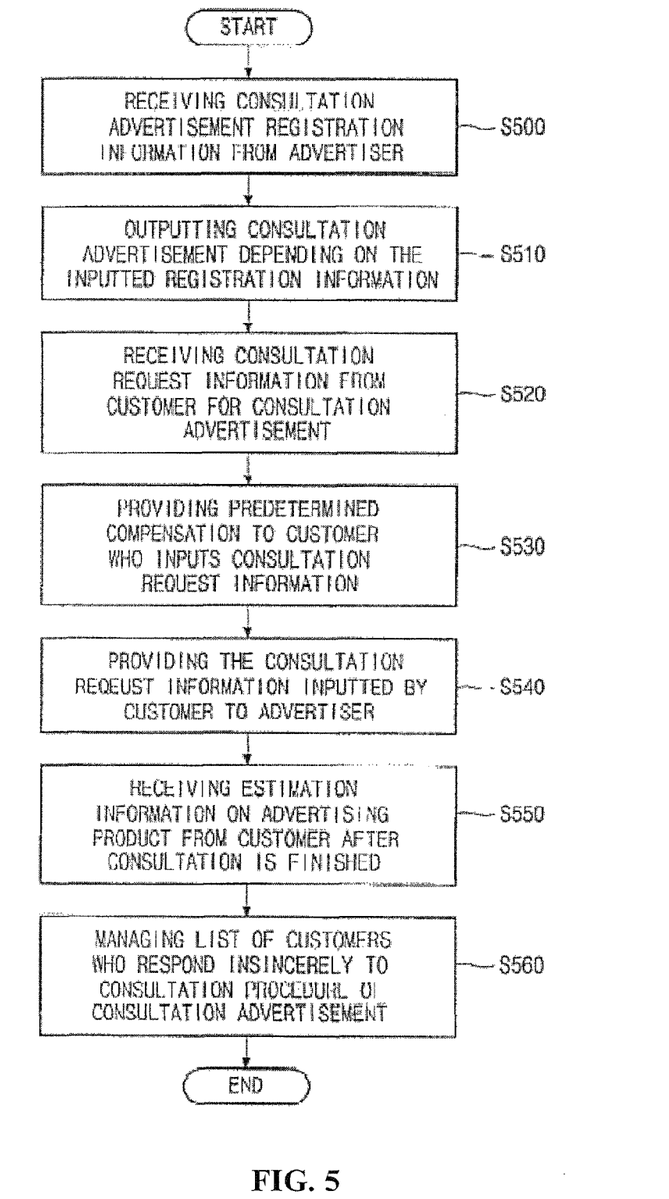
FIG. 5 is a flow chart illustrating a method for providing advertisement inducing active participation from targeted customers according to an embodiment of the present invention.

FIG. 5 is a flow chart illustrating a method for providing advertisement inducing active participation from targeted customers according to an embodiment of the present invention.

Referring to FIG. 5, consultation advertisement registering information is inputted from advertisers (S500).

As the consultation advertisement registering information, a question that a customer responds to may be inputted. When the question has a multiple choice type, a replay to the question may be inputted.

Furthermore, as the consultation advertisement registering information, information on targeted customers who can receive a consultation can be inputted depending on consultation advertisement. The range of targeted customers who can receive consultation can be determined by sex, regional groups and age.

As the consultation advertisement registering information, compensation information offered to the customer who requests a consultation can be inputted. A compensation may be provided upon consultation request or depending on proceeding results after the consultation procedure is finished so that compensation information of each case can be inputted.

The consultation advertisement is outputted depending on the inputted consultation advertisement registering information (S510).

A question that the customer responds to or a replay thereto is outputted while the consultation advertisement is outputted.

The compensation information provided to the customer who requests a consultation can be outputted while the consultation advertisement is outputted.

The information on the targeted customers who receive a consultation can be outputted while the consultation advertisement is outputted.

The consultation request information on the consultation advertisement is inputted from customers (S520).

Next, a reply to a basic question on the consultation request is inputted as the consultation request information.

A mobile phone number or an email address of the customer can be inputted as the consultation request information.

In order to perform a certification on the mobile phone number or the email address, a certification number is transmitted by the inputted mobile phone number or the email address, and the transmitted certification number is inputted from the customer. The certification process is finished if the transmitted certification umber is identical with the inputted certification number, and a message that represents certification failure is outputted if the certification numbers are not the same.

Then, a consultation reservation of the customer who passes the certification can be received.

A predetermined compensation is provided to the customer who inputs the consultation request information (S530).

A predetermined compensation can be provided right after a product is requested. After the consultation procedure is finished, a predetermined compensation is provided depending on the proceeding results of the consultation procedure.

A compensation can be provided with coupons, mileages or cyber items (G stamp).

The consultation request information received from the customer is offered to an advertiser (S540). The advertiser performs a consultation depending on the consultation request information.

After the consultation is finished, estimation information on the advertising product is inputted from the customer (S550). The estimation information on the advertising product received from the customer may be used to determine kinds and display order of advertising products and to improve a consultation advertising method or a consultation proceeding method.

A list of customers who respond insincerely to the consultation procedure of the consultation advertisement is administered (S560). When a consultation is requested on the same product or other products, a message to refuse the consultation request is outputted to customers included in the list so that the consultation request is not admitted in those customers.

Figure 6:
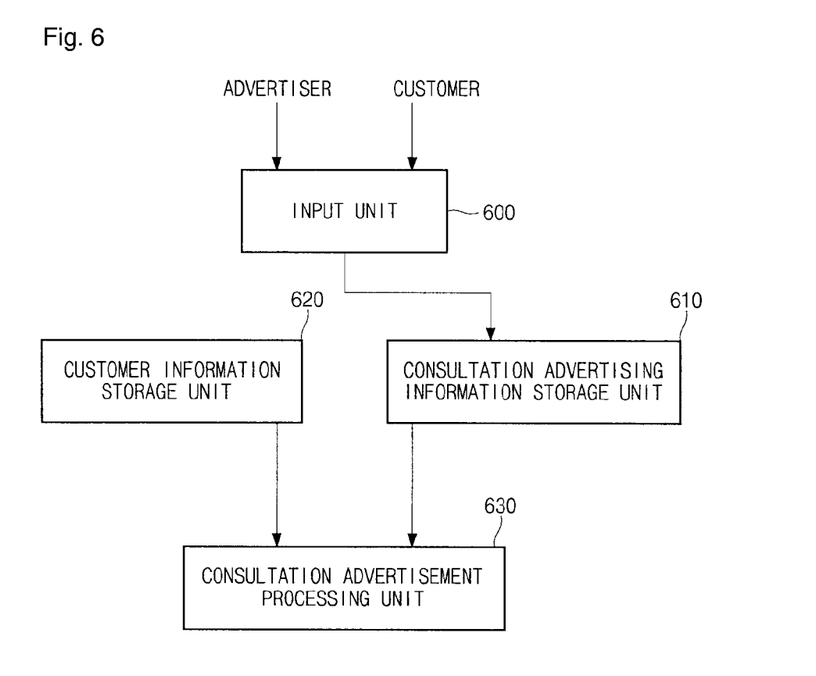
FIG. 6 is a block diagram illustrating a system for providing advertisement inducing active participation from targeted customers according to an embodiment of the present invention.

FIG. 6 is a block diagram illustrating a system for providing advertisement inducing active participation from targeted customers according to an embodiment of the present invention.

Referring to FIG. 6, the advertisement providing system includes an input unit 600, a consultation advertising information storage unit 610, a customer information storage unit 620 and a consultation advertisement processing unit 630.

The input unit 600 receives consultation advertisement registering information from advertisers and consultation request information from customers.

The consultation advertising information storage unit 610 stores the consultation advertisement registering information received from the advertisers and the consultation request information received from the customers.

The customer information storage unit 620 stores customer information, which can be used to identify whether a customer corresponds to a targeted one who receives a consultation advertisement. The customer information may include a mobile phone number or an email address. Also, the customer information may be use to identify whether a customer responds insincerely to the consultation procedure.

The consultation advertisement processing unit 630 outputs a consultation advertisement depending on the consultation advertisement registering information received from the advertisers, provides the consultation request information received from the customers to the advertisers, and offer a predetermined compensation to a customer who requests a consultation.

Figure 7:
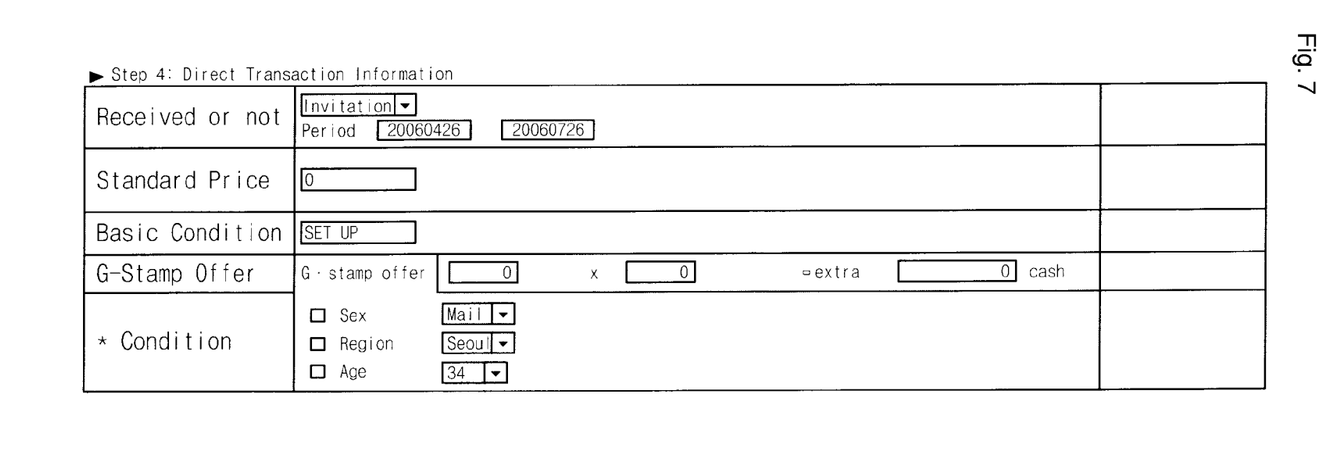
FIG. 7 is an example illustrating an information input screen for registering consultation advertisement from advertisers according to an embodiment of the present invention.

FIG. 7 is an example illustrating an information input screen for registering consultation advertisement from advertisers according to an embodiment of the present invention.

Referring to FIG. 7, a question that the customer responds to or a replay thereto is inputted as a consultation basic condition. Therebelow, compensation information is inputted which is provided to a customer who inputs the consultation request information. Here, a compensation is offered with a G stamp which is a kind of cyber items. Therebelow, targeted customers are inputted who can receive a consultation depending on consultation advertisement. The range of targeted customers who can receive consultation can be determined by sex, regional groups and age.

FIG. 8 is an example illustrating a consultation advertisement output screen according to an embodiment of the present invention.

Referring to FIG. 8, basic information on advertising products is outputted at the top left side of the screen, and information related to the consultation request is outputted at the right side of the screen.

If the information related to the consultation request is specifically examined, a basic question on the consultation request that a customer responds to is outputted first, and then compensation information offered to customers upon consultation request and targeted customers who can receive a consultation are outputted therebelow.

After a reply to the basic question on the consultation request is selected, a specific consultation is requested when a button consultation request is clicked.

Figure 9:
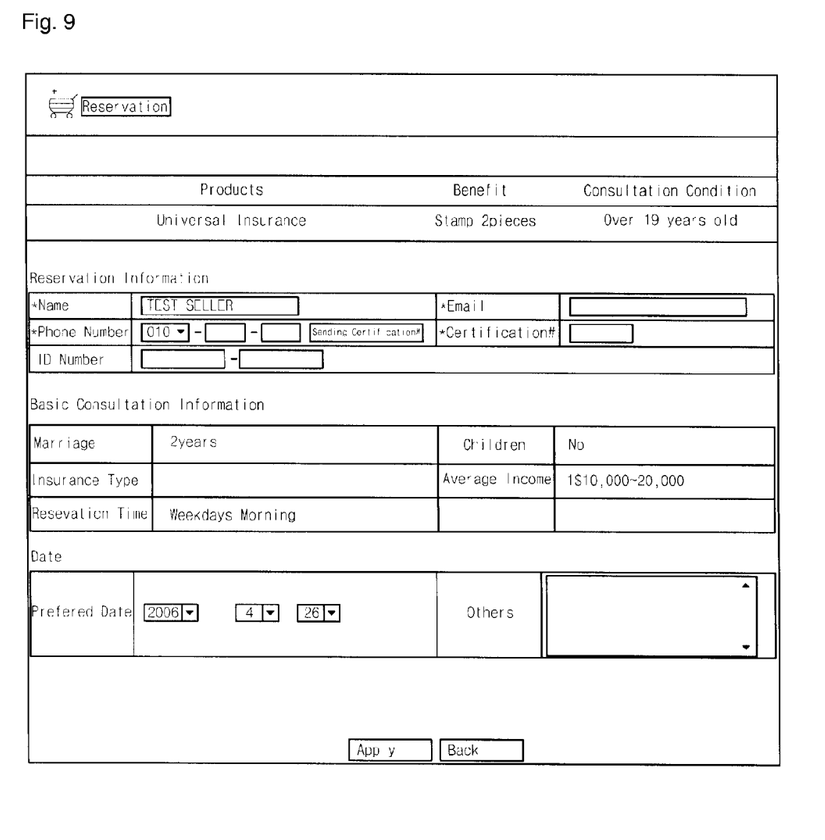
FIG. 9 is an example illustrating a consultation reservation screen according to an embodiment of the present invention.

FIG. 9 is an example illustrating a consultation reservation screen according to an embodiment of the present invention.

Referring to FIG. 9, a product name, a consultation request condition and compensation information are outputted at the top of the screen, and a reservation name, a mobile phone number or an email address as reservation information are inputted therebelow. In order to perform a certification on the mobile phone number or the email address, a certification number transmitted by the mobile phone number or the email address is inputted.

The certified customer selects a consultation-expected date, inputs other request items, and then requests a consultation.

Figure 10:
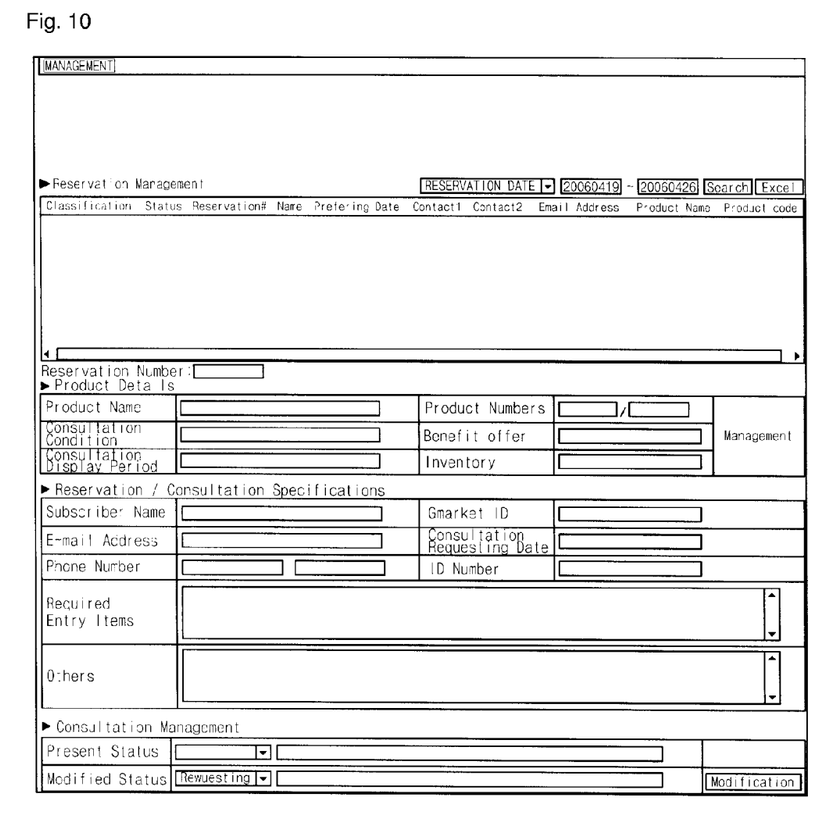
FIG. 10 is an example illustrating a consultation management screen of advertisers according to an embodiment of the present invention.

FIG. 10 is an example illustrating a consultation management screen of advertisers according to an embodiment of the present invention.

Referring to FIG. 10, a list of customers who request a consultation is outputted, and then detailed information of consultation request advertising products and reservation/consultation details are outputted.

INDUSTRIAL APPLICABILITY

As described above, a method for providing advertisement inducing active participation from targeted customers and a system therefore have the following effects: to provide a high advertising effect to advertisers through active participation of customers and offer a predetermined compensation to customers participated in consultation; to advance effective promotions and consultations by setting targeted customers that advertisers provide consultations; and to prevent generation of unnecessary cost by inhibiting consultation requests of customers who respond insincerely to a consultation procedure.

While the invention is susceptible to various modifications and alternative forms, specific embodiments have been shown by way of example in the drawings and described in detail herein. However, it should be understood that the invention is not limited to the particular forms disclosed. Rather, the invention covers all modifications, equivalents, and alternatives falling within the spirit and scope of the invention as defined in the appended claims.

The invention claimed is:

1. A method for providing an advertisement on a website to induce active participation from targeted customers, the method comprising providing a processor performing the operations of:
   (a) receiving consultation advertisement registering information from advertisers via an advertiser information input screen having input fields for the consultation advertisement registering information, and storing the consultation advertisement registering information received, via the input fields, in a consultation advertising information storage medium,
   the input fields for the consultation advertisement registering information comprising a first condition input field for receiving a question or a reply to which a customer will respond and a second condition input field for receiving data defining targeted customers who can receive a consultation of a particular consultation advertisement, the targeted customers being defined using input fields indicating sex, regional groups, and age;
   (b) outputting a consultation advertisement on the website according to the registering information input by the advertiser, the question or the reply to which the customer will respond and the data defining the targeted customers who can receive the consultation of a particular consultation advertisement both being output via a screen with the consultation advertisement;
   (c) receiving consultation requesting information including a response from the customer to the question or the reply to which the customer will respond via a consultation request information input field on the screen with the consultation advertisement,
   the response from the customer or the reply to which the customer will respond including information indicating sex, regional group, and age of the customer;
   (d) determining whether the customer is to receive a consultation of a particular consultation advertisement by comparing the customer's information indicating sex, regional group, and age with a profile of the targeted customers;
   (e) outputting compensation information informing of a predetermined compensation that would be provided to the customer if the customer requests a consultation, the compensation information being output upon the condition that the customer's information indicating sex, regional group, and age corresponds to the profile of the targeted customers, the compensation information being output via the screen with the consultation advertisement and the question or the reply to which the customer will respond, the predetermined compensation comprising one or more of a set of coupons, a set of cyber items, or mileage;

(f) providing, in response to the request for consultation, a first portion of the predetermined compensation to the customer who requests the consultation via a consultation request input field, while deferring a second portion of the predetermined compensation until after a consultation procedure is finished; and (g) presenting an expected date input field to the customer, the expected date input field being configured to enable the customer to request a date for reservation of the consultation.

2. The method according to claim 1, wherein the input fields for the consultation advertisement registering information comprise a third condition input field for receiving compensation information of the predetermined compensation that is to be provided to the customer who inputs consultation requesting information to the consultation request input field on the website.

3. The method according to claim 1, wherein the question or the reply to which the customer will respond comprises a basic question, wherein the operation (c) includes providing a consultation request information input field for receiving a reply from a customer to the basic question.

4. The method according to claim 1, wherein the operation (c) includes: providing a consultation request information input field for receiving a mobile phone number or an email address of the customer and a certification of the mobile phone number or the email address, the certification being a data sent to the mobile phone number or the email address of the customer after receiving the mobile phone number or the email address of the customer via the consultation request information input field.

5. The method according to claim 4, wherein the operation (c) further includes certifying the customer according to the certification received via the consultation request information input field and providing the consultation request input field for receiving a consultation reservation from the certified customer.

6. The method according to claim 1, further comprising providing the consultation request information to the advertiser.

7. The method according to claim 1, further comprising receiving estimating information on advertising products, via an estimating information input field, from the customer after consultation.

8. The method according to claim 1, further comprising managing and storing in a customer information storage medium lists of customers who respond insincerely to consultation of the consultation advertisement.

9. The method according to claim 8, further comprising, upon receipt of a consultation request, via the consultation request input field on the website:
   determining whether a customer who inputs the consultation request is in the lists stored in the customer information storage medium; and
   outputting a message to refuse the consultation request when the customer is determined to be included in the lists.

10. A system for providing an advertisement on a website to induce active participation from targeted customers, the system comprising:
   an input unit configured to receive consultation advertisement registering information from advertisers including information on targeted customers, via an advertiser information input screen, and consultation request information from a customer via a consultation request input field on the website with a consultation advertisement, the targeted customers being defined using input fields indicating sex, regional groups, and age,
   the input unit being configured to receive consultation requesting information including a response from the customer to the question or the reply to which the customer will respond via a consultation request information input field on the screen with the consultation advertisement, the response from the customer or the reply to which the customer will respond including information indicating sex, regional group, and age of the customer;
   a consultation advertising information storage medium configured to store consultation advertising registering information received from the advertisers and consultation request information received from the customer;
   a customer information storage medium configured to store customer information; and
   a consultation advertisement processor configured to:
      output a consultation advertisement on the website depending on consultation advertisement registering information received from the advertisers;
      provide consultation request information received from the customer for the advertisers;
      determine whether the customer is to receive a consultation of a particular consultation advertisement by comparing the customer's information indicating sex, regional group, and age with a profile of the targeted customers;
      offer a predetermined compensation to the customer who requests a consultation, the consultation advertisement processor being configured to output a screen for the consultation advertisement on the website having input fields including a question or reply to which the customer will respond with the consultation advertisement and outputs information of the predetermined compensation on the screen for the consultation advertisement upon the condition that the customer's information indicating sex, regional group, and age corresponds to a profile of the targeted customers, the predetermined compensation comprising one or more of a set of coupons, a set of cyber items, or mileage to be provided to the customer in at least two portions comprising a first portion to be provided based on the customer's request for consultation, and a second portion to be provided based on the customer's finishing a consultation procedure; and
      present an expected date input field to the customer, the expected date input field being configured to enable the customer to request a date for reservation of the consultation.

11. The system according to claim 10, wherein the consultation advertisement processor provides the first portion of the compensation before the customer finishes the consultation procedure.

12. The system according to claim 10, wherein the consultation advertisement processor provides the first portion of the compensation immediately after the customer requests the consultation.

13. The method according to claim 1, wherein the consultation advertisement processor provides the first portion of the compensation before the customer finishes the consultation procedure.

14. The method according to claim 1, wherein the consultation advertisement processor provides the first portion of the compensation immediately after the customer requests the consultation.

* * * * *